US008260616B2

(12) United States Patent  (10) Patent No.: US 8,260,616 B2
O'Conor et al.  (45) Date of Patent: Sep. 4, 2012

(54) SYSTEM AND METHOD FOR AUDIO CONTENT GENERATION

(75) Inventors: William C. O'Conor, Potomac, MD (US); Nathan T. Bradley, Tuscon, AZ (US)

(73) Assignee: AudioEye, Inc., Tucson, AZ (US)

( * ) Notice: Subject to any disclaimer, the term of this patent is extended or adjusted under 35 U.S.C. 154(b) by 0 days.

(21) Appl. No.: 13/098,677

(22) Filed: May 2, 2011

(65) Prior Publication Data

US 2011/0231192 A1    Sep. 22, 2011

(51) Int. Cl.
    *G10L 13/08* (2006.01)
(52) U.S. Cl. ............... 704/260; 704/270; 704/271
(58) Field of Classification Search ............ 704/271, 704/270, 260
    See application file for complete search history.

(56) References Cited

U.S. PATENT DOCUMENTS

| 7,334,050 | B2 * | 2/2008 | Zondervan et al. ........... 709/246 |
| 2004/0128136 | A1 * | 7/2004 | Irani ........................... 704/270.1 |
| 2004/0199392 | A1 * | 10/2004 | Khatri et al. .................. 704/277 |
| 2005/0033577 | A1 * | 2/2005 | Bradley et al. ............. 704/270.1 |
| 2007/0174340 | A1 * | 7/2007 | Gross ......................... 707/104.1 |
| 2007/0219908 | A1 * | 9/2007 | Martinez ........................ 705/51 |
| 2011/0196861 | A1 * | 8/2011 | Egnor et al. .................. 707/723 |

* cited by examiner

*Primary Examiner* — Jakieda Jackson
(74) *Attorney, Agent, or Firm* — Patton Boggs LLP

(57) ABSTRACT

A system and method for generating audio content. Content is automatically retrieved from an original website according to a predetermined schedule to generate retrieved content. The retrieved content is converted to one or more audio file. A hierarchy is assigned to the one or more audio files to provide an audible website that mimics a hierarch of the retrieved content as represented at the original website. The audible website is stored in a database for retrieval by one or more users. A first user input is received indicating an attempt to access the original website. The audible website is indicated as being associated with the original website in response to the user selection. Portion of the audible website are played in response to a second user input.

20 Claims, 7 Drawing Sheets

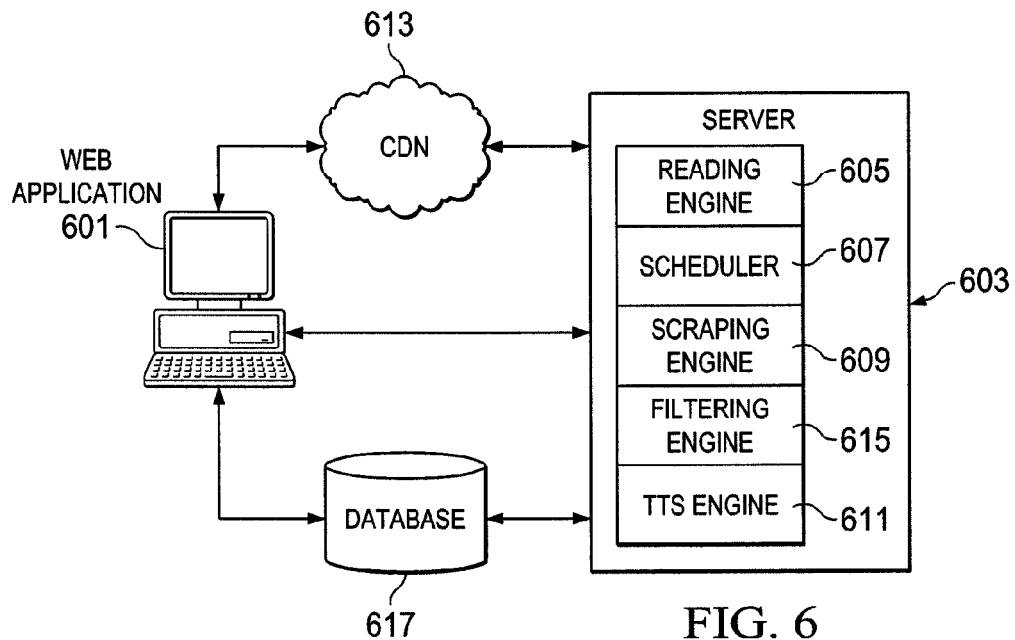
FIG. 6
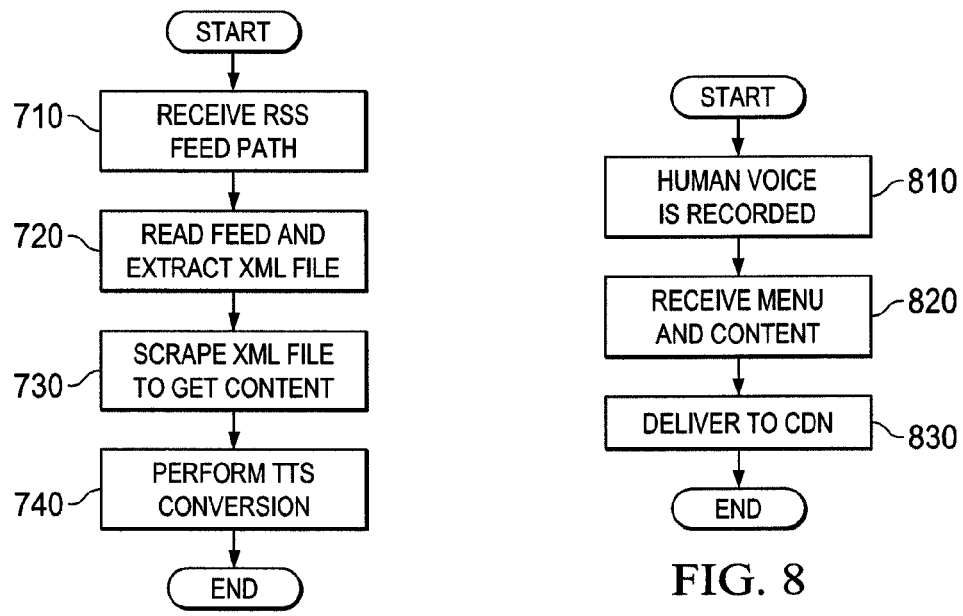
FIG. 7
FIG. 8

SYSTEM AND METHOD FOR AUDIO CONTENT GENERATION

CROSS-REFERENCE TO RELATED APPLICATIONS

This application claims priority to co-pending U.S. patent application Ser. No. 11/682,843, entitled "SYSTEM AND METHOD FOR AUDIBLE WEB SITE NAVIGATION," filed Mar. 6, 2007, which claims the benefit of the filing date of U.S. Provisional Application No. 60/778,975, entitled "METHODS AND SYSTEMS FOR AUDIBLE WEB SITE NAVIGATION," filed on Mar. 6, 2006, which is incorporated herein by reference.

FIELD OF THE INVENTION

Embodiments consistent with this invention relate generally to data processing for the purpose of navigating a computer database, and more particularly relate to a method and apparatus for creating audible output for the use on the web, on mobile phone, and mp3 devices, and enabling any user, but especially visually-impaired and disabled users, to access and navigate the output based on audio cues.

BACKGROUND

Websites and many other computer files are created with the assumption that those who are using the files can see the file content on a computer monitor. Because websites are developed with the assumption that users can see, the sites do not convey much content audibly, nor do the sites convey navigation architecture, such as menus and navigation bars, audibly. The result is that visually-impaired and physically disabled users have difficulty using such websites.

Conventional systems have been developed to help visually-impaired users use websites, but these systems often require software and hardware to be installed at the user's computer. Many of these systems simply use screen reading technology alone or in combination with print magnifying software applications. The systems have shown to be costly, unwieldy, and inconvenient. Furthermore, because such technology is installed on the user's computer, visually-impaired users cannot effectively use conventional computer files anywhere except at their own computers. As a consequence, websites and other computer files are often inaccessible to visually-impaired user anywhere except at home.

Several conventional systems have been developed to overcome this problem by enabling visually-impaired users to access some computer information using any touchtone telephone. In essence, a caller accesses a special computer by telephone. The computer has access to computer files that contain audio components, which can be played back though the telephone to the user. For example, a text file that has been translated by synthetic speech software into an audio file can be played back to the user over the telephone. Some systems access audio files that have already been translated; some translate text-to-speech on the fly upon the user's command. To control which files are played, the user presses the keys on the touchtone keypad to send a sound that instructs the computer which audio file to play.

Unfortunately, these systems also have drawbacks. Large files or those having multiple nesting layers turn the system into a giant automated voice response system, which is difficult to navigate and often very frustrating. Typically only text is played back to the user. Graphics, music, images and navigation systems like those on a website are not. Furthermore, the metallic voice of the computer-generated speech does not convey meaning with inflection like a human does, and is tedious to listen to, especially for significant volumes of information.

SUMMARY

One embodiment provides a system and method for generating audio content. Content may be automatically retrieved from an original website according to a predetermined schedule to generate retrieved content. The retrieved content may be converted to one or more audio file. A hierarchy may be assigned to the one or more audio files to provide an audible website that mimics a hierarch of the retrieved content as represented at the original website. The audible website may be stored in a database for retrieval by one or more users. A first user input may be received indicating an attempt to access the original website. The audible website may be indicated as being associated with the original website in response to the user selection. Portions of the audible website may be played in response to a second user input.

Another embodiment provides a server for generating audio content. The server may include a network interface operable communicate with a web application through a network. The web application may be accessible by one or more users to receive a selection of an original website. The server may also include logic include a reading engine for retrieving content from the original website. The reading engine marks the content for scraping according to a hierarchical organization. The logic may also include a harvesting engine for harvesting the content from the original website according to a predetermined schedule to generate harvested content. The logic may also include a filtering engine operable to filter the harvested content to remove source code references to generate filtered content. The logic may also include a text-to-speech engine for converting the filtered content to an audible website including one or more audio files. The logic may also include a database for storing the audible website for access the one or more users through the web application.

Another embodiment provides a server for generating an audible website. The server may include a processor for executing a set of instructions and a memory for storing the set of instructions. The set of instructions may be executed to automatically scrape content from an original website according to a predetermined schedule to generate scraped content, converting the scraped content to one or more audio files, assign a hierarchy to the one or more audio files to provide an audible website that mimics a hierarchy of the scraped content as represented at the original website, store the audible website in a database for retrieval by one or more users, receive a first user input indicative of an attempt to access the original website, indicate the audible website is associated with the original website in response to the user selection, and play portions of the audible website in response to a second user input.

BRIEF DESCRIPTION OF THE DRAWINGS

The accompanying drawings, which are incorporated in and constitute a part of this specification, illustrate an implementation of methods and systems consistent with the present invention and, together with the description, serve to explain advantages and principles consistent with the invention. In the drawings.

FIG. 6 illustrates an interaction among components of one embodiment consistent with the present invention;

FIG. 7 illustrates a method for converting an XML feed to speech consistent with one embodiment of the present invention;

FIG. 8 illustrates a method for human-enabled conversion of a web site to speech consistent with one embodiment of the present invention;

DETAILED DESCRIPTION

Methods and systems consistent with the present invention create audio files from files created originally for sighted users. Files created originally for primarily sighted-users are referred to herein as original files. An organized collection of original files is referred to herein as an original website. Thus, a hierarchy and navigation system may be assigned to the audio files based on the original website design, providing for access to and navigation of the audio files.

The audio files may be accessed via a user's computer. An indicator may be included in an original file that will play an audible tone or other sound upon opening the file, thereby indicating to a user that the file is audibly accessible. Upon hearing the sound, the user indicates to the computer to open the associated audio file. The content of the audio file is played though an audio interface, which may be incorporated into the user's computer or a standalone device.

The user may navigate the audio files using keystroke navigation through a navigation portal. Unlike the touchtone telephone systems which require an audio input device, embodiments consistent with the present invention may utilize toneless navigation. In one embodiment consistent with the present invention, the user may use voice commands that are detected by the navigation portal for navigation. In yet another embodiment, the user actuates a touch screen for navigation. The navigation portal may be implemented on a computer system, but may also be implemented in a telephone, television, personal digital assistant, or other comparable device.

Reference will now be made in detail to an implementation consistent with the present invention as illustrated in the accompanying drawings.

Figure 1:
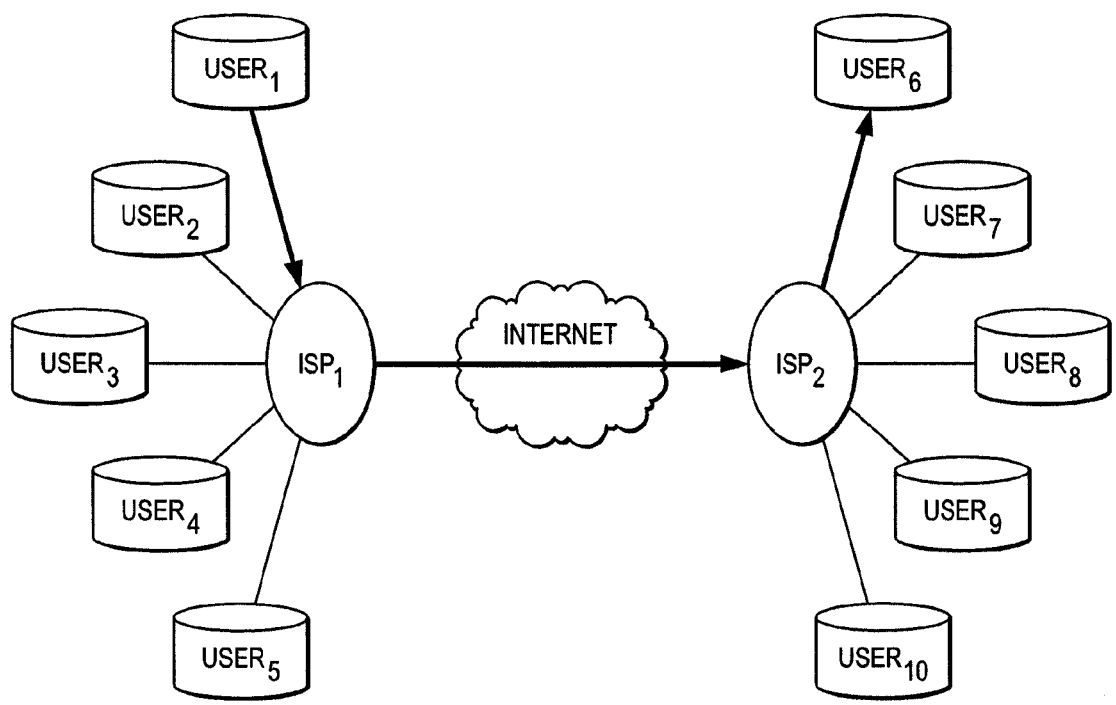
FIG. 1 illustrates the Internet.
Figure 2:
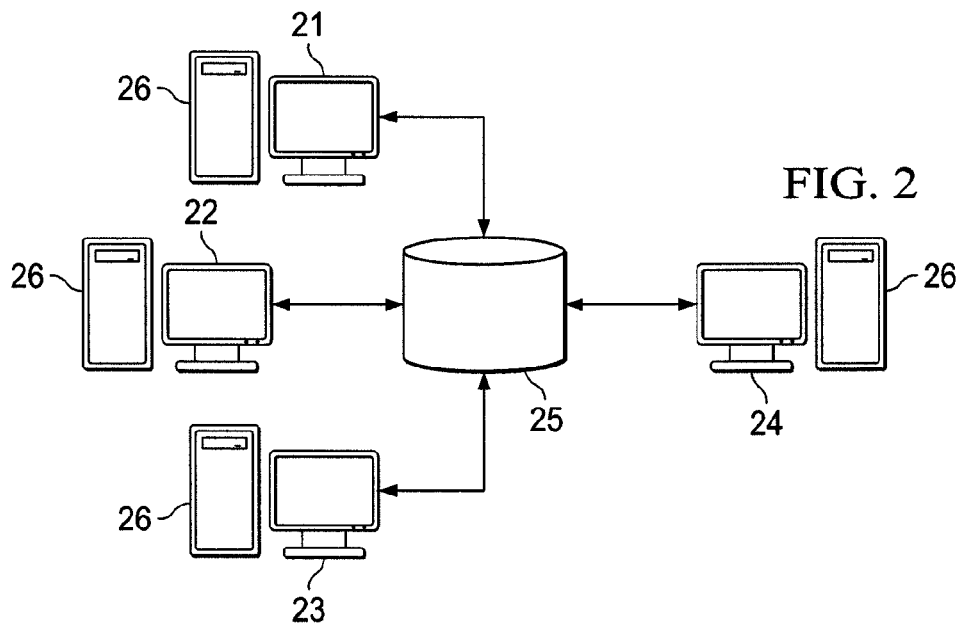
FIG. 2 illustrates an exemplary computer network.

One embodiment consistent with the present invention may be applied to original web pages hosted on remote computers of a global computer network, for example, the Internet. FIG. 1 illustrates a plurality of users' computers, indicated as $user_i$ . . . $user_x$, communicating with each other through remote computers networked together. Another embodiment consistent with the present invention may be used for smaller computer networks, such as local area or wide area networks. FIG. 2 illustrates such a network, where a plurality of users' computers, 21, 22, 23 and 24 communicate through a server 25. In this example, each user's computer may have a standalone audio interface 26 to play audio files. Alternatively, the audio interface could be incorporated into the users' computers.

In one embodiment consistent with the present invention, audio files may be created by converting text, images, sound and other rich media content of the original files into audio files through a site analysis process. In this embodiment, a human reads the text of the original file and the speech is recorded. The human also describes non-text file content and file navigation options aloud and this speech is recorded. Non-speech content, such as music or sound effects, is also recorded, and these various audio components are placed into one or more files. Any type of content, such as but not limited to FLASH, HTML, XML, .NET, JAVA, or streaming video, may be described audibly in words, music or other sounds, and can be incorporated into the audio files. A hierarchy is assigned to each audio file based on the original computer file design such that when the audio file is played back through an audio interface, sound is given forth. The user may hear all or part of the content of the file and can navigate within the file by responding to the audible navigation cues.

Figure 3:
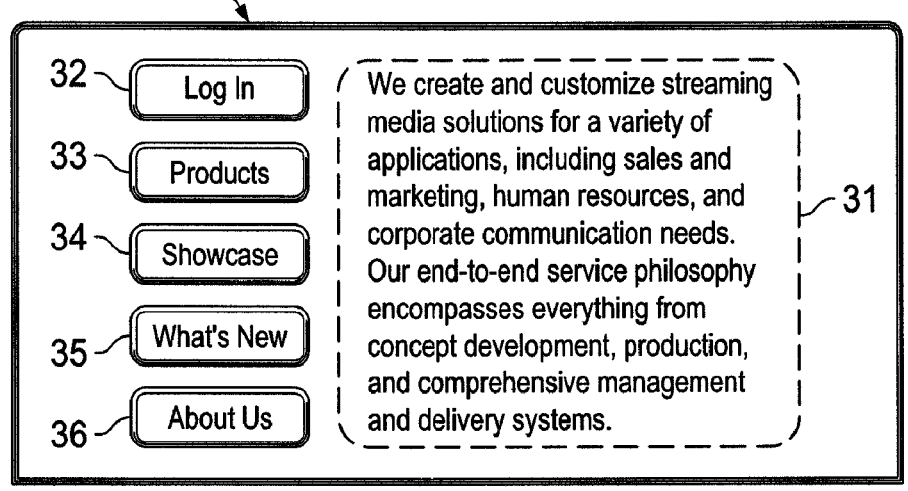
FIG. 3 illustrates an exemplary home page of an original website.

In this embodiment, an original website is converted to an audible website. Each file, or page, of the original website is converted to a separate audio file, or audio page. The collection of associated audio files may reside on a remote computer or server. For example, FIG. 3 illustrates the home page 30 of an original website. A human reads aloud the text content 31 of the home page 30 and the speech is recorded into an audio file. The human says aloud the menu options 32, 33, 34, 35, 36 which are "LOG IN", "PRODUCTS", "SHOWCASE", "WHAT'S NEW", and "ABOUT US", respectively, that are visible on the original website. This speech is also recorded.

Similarly, a human reads aloud the text content and menu options of other files in the original website and the speech is recorded into audio files. In this example, key 1 is assigned to menu option 32, LOG IN; key 2 is assigned to menu option 33, PRODUCTS; key 3 is assigned to menu option 34, SHOWCASE; key 4 is assigned to menu option 35, WHAT'S NEW; key 5 is assigned to menu option 36, ABOUT US. Other visual components of the original website may also be described in speech, such as images or colors of the website, and recorded into one or more audio files. Non-visual components may also be recorded into the audio files, such as music or sound effects.

Figure 4:
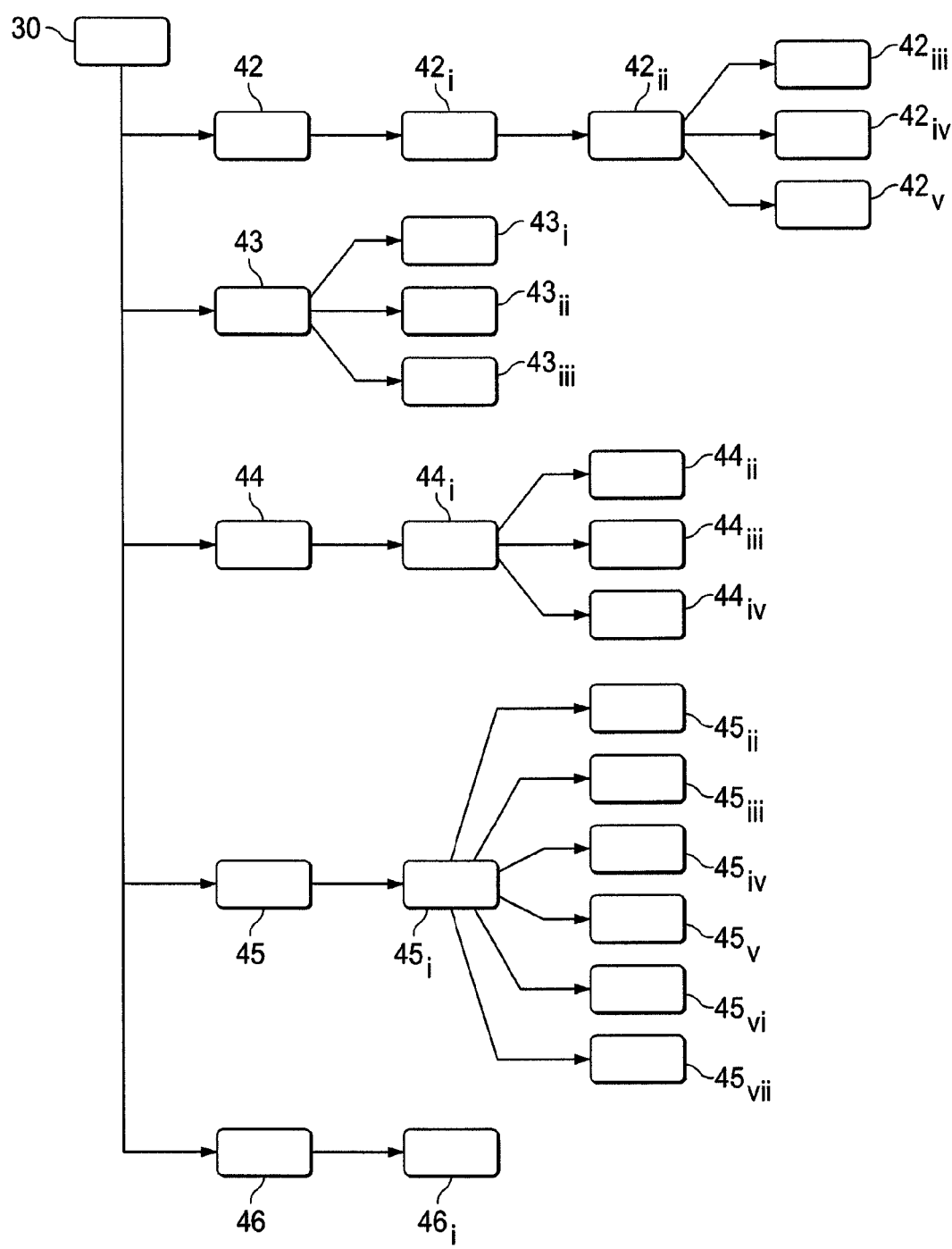
FIG. 4 illustrates an exemplary hierarchy of pages in a website.

FIG. 4 shows an exemplary hierarchy of the original files which form the original website 40. Menu option 32 will lead to the user to file 42, which in turn leads to the files $42_i$ . . . v. Menu option 33 will lead to the user to file 43, which in turn leads to the files $43_i$ . . . iii. Menu option 34 will lead to the user to file 44, which in turn leads to the files $44_i$ . . . iv, similarly for all the original files of the original website. The collection of audio files will follow a hierarchy substantially similar to that shown in FIG. 4 to form an audible website which is described audibly.

In one embodiment consistent with the present invention, text is inputted into a content management system (CMS) and automatically converted to speech. Upon acquisition of the text, a third party text-to-speech engine, such as AT&T Natural Voices or Microsoft Reader, is invoked and an audio file, such as a .wav file, or .mp3 file is created. The audio file may be encoded according to a standard specification, such as a standard sampling rate. Once encoded, the audio file is uploaded to a Content Delivery Network (CDN) and a URL path is established for content access. The URL path of the audio content is associated with a navigation value in a navigation database. During browsing, a user selection having a navigation value is mapped to an audio content URL using the navigation database. The audio content is then acquired and played on the client system.

In another embodiment consistent with the present invention, syndicated web site feeds are read and structured information documents are converted into audio enabled web sites. In one example, the syndicated web site feed is a Really Simple Syndication (RSS) and the structure information document is an XML file. An RSS URL is first entered into the CMS. An RSS scraping logic is entered into the content management system and upon predefined schedule, an RSS content creation engine is invoked. The RSS content creation engine extracts the content titles, descriptions, and order from the feed following the RSS structure provided from the feed. The URL path to the story content is deployed into a scraping engine and the text is extracted using the scraping logic. The content is then filtered to remove all formatting and non-contextual text and code.

A text-to-speech conversion is completed for both titles and main story content. The converted titles and content, now in an audio format such as a .wav file, are uploaded to a CDN and a URL path is established for content access. The URL path of the audio content is associated with a navigation value in a navigation database. During browsing, a user selection having a navigation value is mapped to an audio content URL using the navigation database. The audio content is then acquired and played on the client system. Through XML integration, the content is displayed in text within a media player and when selected using keystrokes or click through the file is played over the web.

The structure of a sample RSS feed file is given below:

```
<?xml version="1.0" encoding="UTF-8" ?>
<rss version="2.0" xmlns:blogChannel=
"http://backend.userland.com/blogChannelModule">
  <channel>
    <title> </title>
    <link> </link>
    <description />
    <language> </language>
    <copyright> </copyright>
    <generator>XML::RSS<generator>
    <ttl> <ttl>
  <image>
    <title> </title>
    <url> </url>
    <link> </link>
  </image>
  <item>
    <title> </title>
    <link> </link>
    <description> description>
    <category> </category>
    <guid isPermaLink="false"> </guid>
    <pubDate> </pubDate>
  </item>
  </channel>
  <rss>
```

Note that a feed file may have multiple <item> tags. Each <item> tag has child tags that provide information about the item. The <title> tag is the tag the system reads and uses when it attempts to determine if an item has changed since it was last accessed. A user creating or editing menus may have the option of selecting RSS as one of the content types. The sequence of events that will eventually lead to menu content creation if the user chooses RSS as a content type are as follows: Menu creation; Reading; Scraping; Filtration; Audio generation; and XML generation.

The Menu Name, Feed Location and the Advanced Options fields are available if the RSS Feed option is selected in the Content Type field. Clicking a Browse button in the Menu Name Audio field may launch a dialog box to let the user select an audio file. Clicking a Save button will save the details of the new menu in the system. The new menu will be in queue for generating the audio for the respective items. The system runs a scheduler application that initiates TTS conversion for menus. This scheduler may also initiate the pulling of the feed file. Thereafter, control will move to the Reading Engine. Clicking a Cancel button will exit the page. The scheduler application and reading engine are described below.

Figure 5:
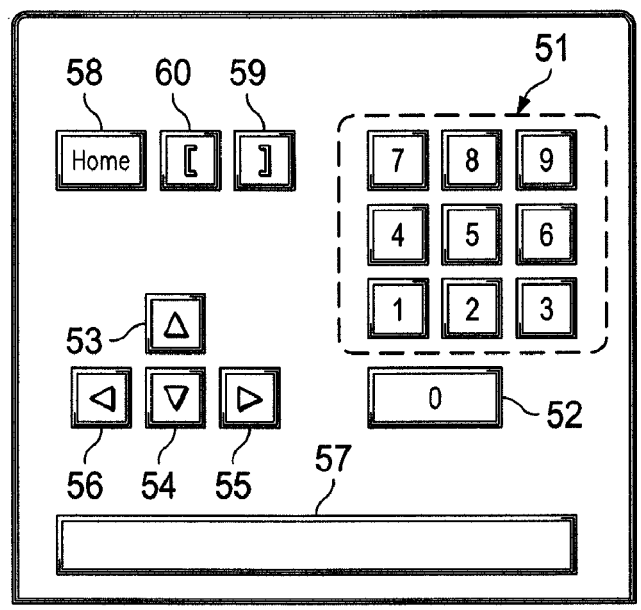
FIG. 5 illustrates a keyboard navigation arrangement consistent with the present invention.

In one embodiment consistent with the present invention, a navigation portal may include a keyboard having at least eighteen keys. As illustrated in FIG. 5, the keys may include ten numbered menu-option keys, four directional arrow keys, a space bar, a home key, and two keys for volume adjustment. The volume keys may be left and right bracket keys. The navigation system may be standard across all participating websites and the keys may function as follows:

the keys numbered 1 though 9 select associated menu options 51;
the key numbered 0 selects help 52;
the up arrow selects forward navigation 53;
the down arrow selects backward navigation 54;
the right arrow key selects the next menu option 55;
the left arrow key selects the previous menu option 56
the spacebar repeats the audio track 57;
the home key selects the main menu 58;
the right bracket key increases the volume of the audible website 59;
the left bracket key decreases the volume of the audible website 60.

The keys may be arranged in clusters as shown in FIG. 5, using a standard numeric 10-key pad layout, or use alternative layouts such as a typewriter keyboard layout or numeric telephone keypad layout. Other types of devices may be used to instruct computer navigation. For example, for users who are not dexterous, a chin switch or a sip-and-puff tube can be used in place of a keyboard to navigate the audible websites.

FIG. 6 illustrates an interaction among components of one embodiment consistent with the present invention. Web application 601 provides a web-based portal through which users may interact with systems consistent with the present invention. Uploaded audio files, XML data files and RSS feeds are provided to server 603 via web application 601. Server 603 includes a reading engine 605 for reading RSS feeds, a scheduler application 607 for scheduling the reading of RSS feeds, a scraping engine 609 for scraping XML and web page source code, a filtering engine for filtering scraped content, and a text to speech (TTS) engine 611 for converting text-based web content to audio content. Server 603 provides audio content to the Content Delivery Network (CDN) 613, which can then provide content to a user through web application 601. Server 603 further provides XML data files to a database 617 for storage and retrieval.

The reading engine 605 is invoked at regular intervals by the scheduler 607 application on the server 603. It pulls the feed file and parses it to assemble a list of items syndicated from the feed URI specified. The first time the feed file is pulled from its URI, the reading engine 605 inspects it and prepare a list of items in the file. These items are created as submenus under the menu for which the feed URI is specified (here onwards, the "base menu").

If this file has previously been read and parsed, each item (i.e., the <item> tag's content) are compared with the submenu at the respective position under the base menu. If the titles do not match, the system may assume that the item has changed and will mark the new item, as a candidate for scraping and the existing item would be removed. In one embodiment, items are compared like this one at a time. Once the items have been compared, this engine hands over control to the scraping engine 609.

The scraping engine 609 accepts the list of items marked for scraping by the reading engine 605. It reads one at a time, the actual links (URLs) to content pages for these items and performs an actual fetch of the content from those pages. This content may be acquired "as is" from the pages. This content is then handed on to the filtering engine 615. The content handed over by the scraping engine 609 may be raw HTML content. The raw HTML content could contain many unclean HTML elements, scripts, etc. These elements are removed by the filtering engine 615 to arrive at human-understandable text content suitable for storage in the menu system as Menu content text. The filtering engine 615 thus outputs clean content for storage in the system's menus. This content is then updated for the respective menus in the system as content text. The menus that are updated will become inactive (if not already so) and will be in queue for content audio generation.

Audio is generated for the updated content in the menus that have been updated by RSS feeds at the closest audio generation sequence executed by the TTS engine 611. Finally XML Data files may be generated/updated with the new menu name, content and audio file name/path. These XML files may be used by a front-end flash application to display the Menu, Content or to play the Audio. An indicator is included in an original website that activates a tone upon a user's visit indicating that the website is audibly accessible. Upon hearing the tone, a user presses a key on his keyboard and enters the audible website. The original website may close or remain open. The user may then navigate the audible website using a keystroke command system. Audible narration is played through an audio interface at the user's computer, describing text and menus and indicating which keystrokes to press to listen to the other audio web files with in the audible website. Users may thus navigate website menus, fast forward and rewind content, and move from website to website without visual clues.

FIG. 7 is a flow chart illustrating a method for converting an XML feed to speech consistent with one embodiment of the present invention. An RSS XML feed is entered in a web application (step 710). The XML/RSS path is read by a content management system and text content is extracted from the feed, indexed into menus, and associated with a web-based content URL (step 720). For each menu item created, servers create an association with a web page and a scrape logic that provides coordinates for source code text extraction, extract the text, filter the text to remove source code references, and then forward the filtered text to the TTS engine (step 730). The TTS engine is then invoked and creates a sound file that is transferred to the CDN, and XML data for the web application is stored as a node in the database (step 740).

FIG. 8 is a flow chart illustrating a method for human-enabled conversion of a web site to speech consistent with one embodiment of the present invention. First, a human voice is recorded from any digital device or desktop application (step 810). A user then uploads menu and content files through an administration panel, and content is converted to an .mp3 file format, indexed, and associated with the intended database content and menu nodes (step 820). One of ordinary skill in the art will recognize that the content may be converted to any existing or future-developed sound file format. The resulting content is delivered to the CDN for delivery to other users, to the database as a URL and text-based label, and to the web application as XML data for navigation (step 830).

Figure 9:
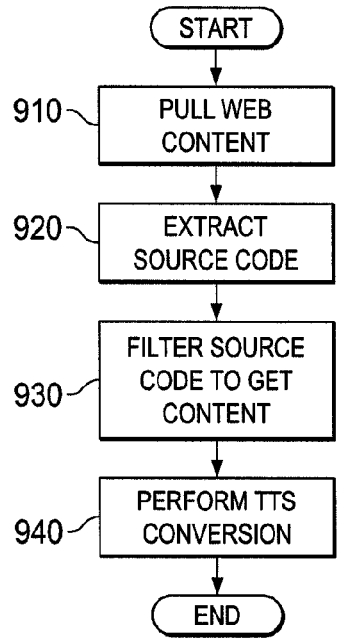
FIG. 9 illustrates a method for converting a published web site to speech consistent with one embodiment of the present invention.

FIG. 9 is a flow chart illustrating a method for converting a published web site to speech consistent with one embodiment of the present invention. Website content is pulled through a browser on a preset schedule (step 910). The source code is read by a content management system and text content is extracted from the source code, indexed into menus, and associated with a web-based content URL (step 920). For each menu item created, servers create an association with a web page and a scrape logic that provides for source code text extraction, extract the text, filter the text to remove source code references, and then forward the filtered text to the TTS engine (step 930). The TTS engine is then invoked and creates a sound file that is transferred to the CDN, and XML data for the web application is stored as a node in the database (step 940).

Figure 10:
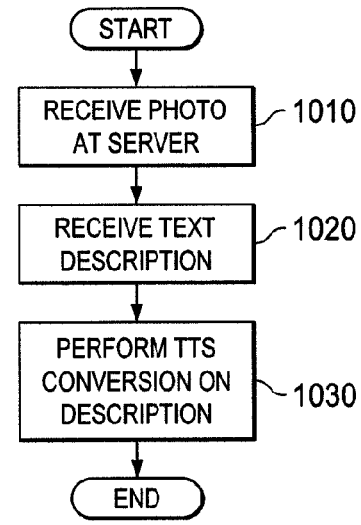
FIG. 10 illustrates a method for providing an audio description of a web-based photo consistent with one embodiment of the present invention.

FIG. 10 is a flow chart illustrating a method for providing an audio description of a web-based photo consistent with one embodiment of the present invention. A photo is saved to the server via the web-based application (step 1010). A text description of the photo is then uploaded via the web application (step 1020). Alternatively, a user may upload a voice description of the photo via the web application. The text description of the photo is then sent to the TTS engine, which creates an audible description of the photo and uploads the description to the CDN (step 1030).

Figure 11:
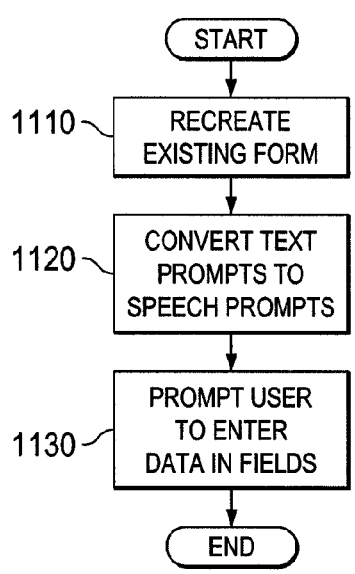
FIG. 11 illustrates a method for converting published interactive forms to speech consistent with one embodiment of the present invention.

FIG. 11 is a flow chart illustrating a method for converting published interactive forms to speech consistent with one embodiment of the present invention. An existing web-based form is recreated using text inputs in the web application (step 1110). The text is forwarded to the TTS engine, which creates audible prompts for various fields in the web-based form (step 1120). An end user then accesses the audible form and enters data into the fields according to the audio prompts (step 1130).

Figure 12:
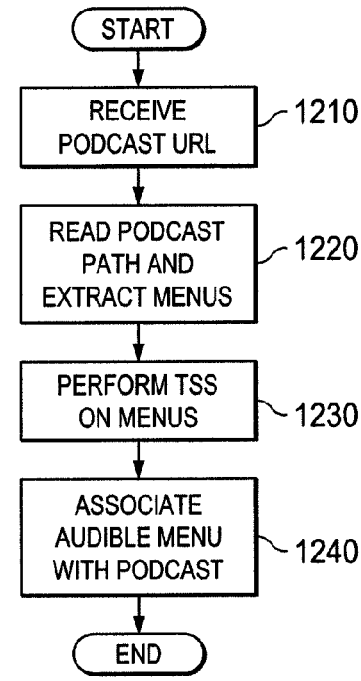
FIG. 12 illustrates a method for indexing podcasts consistent with one embodiment of the present invention.

FIG. 12 is a flow chart illustrating a method for indexing podcasts consistent with one embodiment of the present invention. A URL for a podcast is entered via the web application (step 1210). The podcast URL path is read by the servers and text menu names are created from the feed, indexed into menus, and associated with the content URL (step 1220). The TTS engine is invoked and the menu item content is converted into an audible content menu (step 1230). The audible content menu is then delivered to the CDN and XML is created to point to the podcast from the web application (step 1240).

Figure 13:
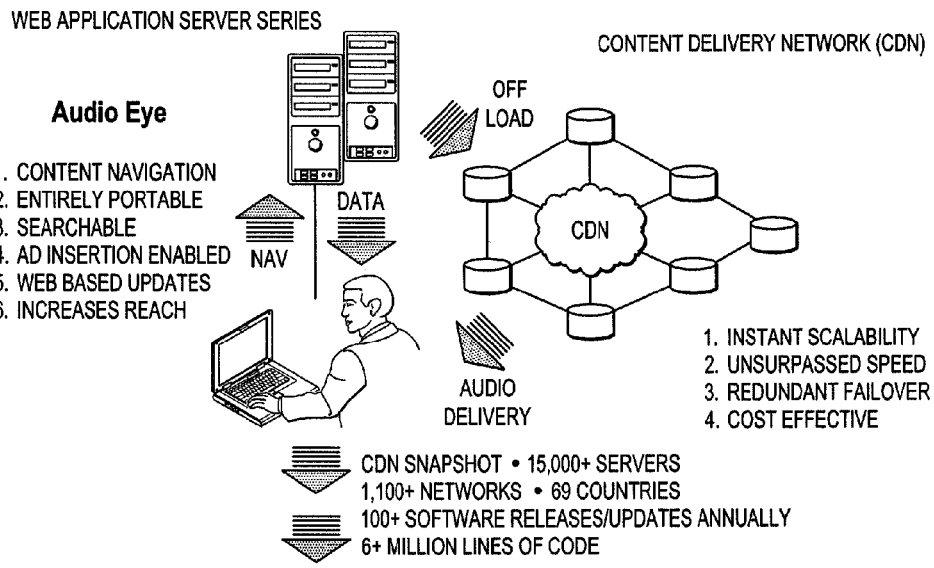
FIG. 13 illustrates an exemplary media player consistent with one embodiment of the present invention.

FIG. 13 illustrates an exemplary media player consistent with one embodiment of the present invention. A media player consistent with an embodiment of the present invention is now described. At any point the end user has the option of pressing 'Home' to return to the main menu, '#' for the help menu, 'N' for the now playing view, 'S' to Search, 'P' for the preferences menu. N now playing is the selected tab, which displays volume control, playback controls (play is highlighted orange (#FF8737) because this sample view assumes an audio track is being played. If not playing a highlighted pause button should display. Likewise, if the arrow keys are—'right, left, up, down'—or the audio controls—'[' or ']'—are pressed, the button is intended to highlight orange.) To the right of these controls may be the Player Status area, which displays the metadata for the audio file. If playing, 'Playing' displays. Other play states should include 'Buffering', 'Paused', 'Stopped'. The player may also display the bit-rate at which the audio track is playing (if possible). Next, it displays the Track Title Name (this should only display a given # of characters and if the title of the track is longer than the maximum # of characters, the title should be truncated and followed by three periods ('...'). Below this a reader may see a navigation bar that displays the 0-100 value of the audio track playing. Lastly, a reader may see a current track time display and the total audio track time display. The Esc button (which, again, would highlight if pressed) is provided to allow the user to exit the player and return to the normal website.

Below the N now playing tab, there may be Surf by Sound Message Center, which provides simple text cues. Also, if the end user has Subtitles turned on, this is where the text being read would be displayed. To the right of the message center may be the navigation choices In a grey area of the nav selection, there may be '/more navigation info ([number] of options)' text. This helps the user follow the path of their navigation. For example if on a homepage with 6 menu options, this are would display '(/home (6 options)'. Further if an end-user chose the 5th menu option (e.g. News & Events) which, for perhaps had 12 menu options, the navigation listing would update and the text area would now display '/News & Events (12 options)'. If there are 12 menu options, the 'more selections >>' text would appear more prevalently and the end user would have the option of seeing what those options are by clicking the button (which, again, would make the button highlight orange). Likewise, if there were more than 10 options for any given menu, the navigation listing may automatically advance and display 6-10 in the nav box on the left, 11-15 on the right, etc.).

The search view assumes the end user pressed S from within the default view (see above). Before searching, the audio menu may allow the end user to choose whether they want to search the current site they are on or the a Surf by Sound Portal, which, if selected, would direct the user to the surf by sound portal. Once selected, they would then automatically be cued up to begin typing their search request. If Audio Key Playback is on, a reader may hear their key strokes. Also, a reader may see that the Message Center displays helpful text description of what they are doing (i.e. it coincides with the general text being read). And the '/search (2 options)' text is displayed since they are on the search tab and there are 2 options to choose from. Lastly, pressing 'E' (which would trigger the highlighted orange) within either the Search or Preferences Menu would Exit the menu and return to the default view.

The preferences view assumes that the user pressed P from within the default view. First, this tab displays the Bandwidth of the user's machine this is an automatically generated test that was conducted when the first opened the player. From within this view the Message Center is updated with information pertaining the general process being described via audio and the nav options coincide with the options from within this preferences tab. The first option is to turn 'Subtitles' On or Off. If on, the media player displays the text being read in the message center display box. The other options within this tab would be turning on or off 'Screen Reader Mode', 'Audio Key-Press', and Magnify Mode'. Lastly, it may also give the user the option of displaying the default view or the 'Player Only'. 'Player Only' display would get rid of (hide) the message center and navigation options boxes.

An embodiment consistent with the present invention may include a control panel to let the administrator manage third party sites. The user may have access to a Manage 3rd Party Sites link in the administration panel under Site Management menu. The administrator may sort the grid on Site Name, Site Contact and Create Date. Clicking a site name may move control to the menu management section for a particular third party site. Control moves to MANAGE THIRD PARTY MENUS. Clicking a site URL may bring up the home page of the site in a new browser window. This page may display a media player for the third party site. Clicking an icon may move control to CREATE THIRD PARTY SITE. Fields prefixed with "*" are required fields. The Username and E-mail must be unique in the system. Clicking the Create button creates the new account. An e-mail may be sent to the administrator's account. Control then moves to the previous page. Clicking the Cancel button unconditionally exits the page. Clicking the Back button moves control to the previous page.

Figure 14:
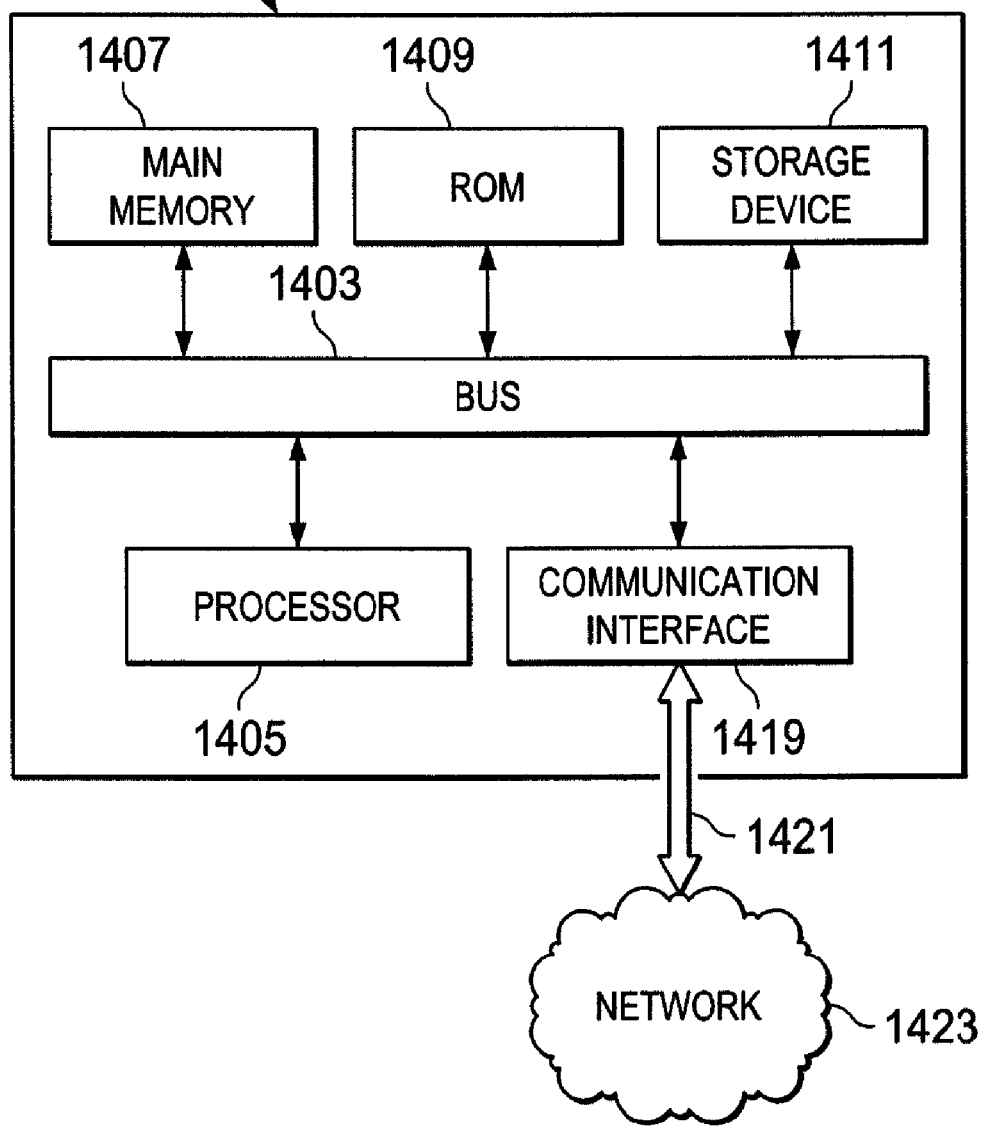
FIG. 14 illustrates a computer system that can be configured to perform methods consistent with the present invention.

Turning to FIG. 14, an exemplary computer system that can be configured as a computing system for executing the methods as previously described as consistent with the present invention is now described. Computer system 1401 includes a bus 1403 or other communication mechanism for communicating information, and a processor 1405 coupled with bus 1403 for processing the information. Computer system 1401 also includes a main memory 1407, such as a random access memory (RAM) or other dynamic storage device, coupled to bus 1403 for storing information and instructions to be executed by processor 1405. In addition, main memory 1407 may be used for storing temporary variables or other intermediate information during execution of instructions to be executed by processor 1405. Computer system 1401 further includes a read only memory (ROM) 1409 or other static storage device coupled to bus 1403 for storing static information and instructions for processor 1405. A storage device 1411, such as a magnetic disk or optical disk, is provided and coupled to bus 1403 for storing information and instructions.

According to one embodiment, processor 1405 executes one or more sequences of one or more instructions contained in main memory 1407. Such instructions may be read into main memory 1407 from another computer-readable medium, such as storage device 1411. Execution of the sequences of instructions in main memory 1407 causes processor 1405 to perform the process steps described herein. One or more processors in a multi-processing arrangement may also be employed to execute the sequences of instructions contained in main memory 1407. In alternative embodiments, hard-wired circuitry may be used in place of or in combination with software instructions. Thus, embodiments are not limited to any specific combination of hardware circuitry and software.

Further, the instructions to support the system interfaces and protocols of system 1401 may reside on a computer-readable medium. The term "computer-readable medium" as used herein refers to any medium that participates in providing instructions to processor 1405 for execution. Common forms of computer-readable media include, for example, a floppy disk, a flexible disk, hard disk, magnetic tape, a CD-ROM, magnetic, optical or physical medium, a RAM, a PROM, and EPROM, a FLASH-EPROM, any other memory chip or cartridge, or any other medium from which a computer can read, either now or later discovered.

Computer system 1401 also includes a communication interface 1419 coupled to bus 1403. Communication interface 1419 provides a two-way data communication coupling to a network link 1421 that is connected to a local network 1423. Wireless links may also be implemented. In any such implementation, communication interface 1419 sends and receives signals that carry digital data streams representing various types of information.

While there has been illustrated and described embodiments consistent with the present invention, it will be understood by those skilled in the art that various changes and modifications may be made and equivalents may be substituted for elements thereof without departing from the true scope of the invention. Therefore, it is intended that this invention not be limited to the particular embodiments disclosed.

What is claimed:

1. A method for generating audio content, comprising:
    automatically retrieving content from an original website according to a predetermined schedule to generate retrieved content;
    converting the retrieved content to audio files, utilizing a processor;
    assigning a hierarchy to audio files to provide an audible website that mimics a hierarchy of the retrieved content as represented at the original website;
    storing the audible website in a database for retrieval by one or more users;
    receiving a first user input indicative of an attempt to access the original website;
    indicating the audible website is associated with the original website in response to the user selection; and
    playing portions of the audible website in response to a second user input.

2. The method according to claim 1, wherein indicating the audible website comprises:
    delivering an audio file, which when executed by a computer system associated with a user having made the user selection causes the computer system to play an audible tone.

3. The method according to claim 1, further comprising:
    filtering the retrieved content to remove source code references prior to performing the converting.

4. The method according to claim 3, wherein the converting is performed by a text-to-speech engine, and wherein the filtering is performed by a filtering engine.

5. The method according to claim 1, wherein the content is text content and non-text content, and wherein the text content includes menu content and is read by a text-to-speech converter to convert the retrieved content to the audio files, and wherein the non-text content is described by the text-to-speech converter to convert the retrieved content to the audio files.

6. The method according to claim 1, wherein the hierarchy is substantially similar to the original website, and wherein the hierarchy is navigated in response to user selections.

7. The method according to claim 1, further comprising:
    generating a toneless navigation interface enabling a user to navigate the audible website.

8. The method according to claim 1, further comprising:
    uploading the audible website to a content delivery network;
    establishing a Uniform Resource Locator (URL) path for accessing the audible website;
    mapping pages of the original website to pages of the audible website.

9. The method according to claim 8, wherein the mapping is performed utilizing a navigation value associated with the audible website by a navigation database, and wherein the audible website is acquired by associating the user selection with the audible website utilizing the navigation value.

10. The method according to claim 1, wherein the original website is a Really Simple Syndication (RSS), and wherein the automatically retrieving is performed to generate a structure information document.

11. The method according to claim 1, wherein the user selection is received through a navigation system that includes some or all of: menu options, forward and backward navigation options, and means for increasing and decreasing volume.

12. A server for generating audio content, the server comprising:
    a network interface operable to communicate with a web application through a network, the web application is accessible by one or more users to receive a selection of an original website;
    logic including:
        a reading engine for retrieving content from the original website, wherein the reading engine marks the content for scraping according to a hierarchical organization;
        a harvesting engine for harvesting the content from the original website according to a predetermined schedule to generate harvested content;
        a filtering engine operable to filter the harvested content to remove source code references to generate filtered content;
        a text-to-speech engine for converting the filtered content to an audible website including audio files organized in a hierarchy that mimics a hierarchy of the retrieved content as represented at the original website; and
        a database for storing the audible website for access the one or more users through the web application.

13. The server according to claim 12, wherein the logic further comprises:
    a scheduler operable to set the predetermined schedule.

14. The server according to claim 12, wherein the content includes text content and non-text content.

15. The server according to claim 14, wherein the text content includes menu content and is read by the text-to-speech engine to generate the audio files, and wherein the non-text content is described by the text-to-speech engine to generate the audio files.

16. A server for generating an audible website, comprising:
    a processor for executing a set of instructions; and
    a memory for storing the set of instructions, the set of instructions are executed to:
        automatically scrape content from an original website according to a predetermined schedule to generate scraped content;
        converting the scraped content to audio files;
        assign a hierarchy to the audio files to provide an audible website that mimics a hierarchy of the scraped content as represented at the original website;
        store the audible website in a database for retrieval by one or more users;
        receive a first user input indicative of an attempt to access the original website;
        indicate the audible website is associated with the original website in response to the user selection; and
        play portions of the audible website in response to a second user input.

17. The server according to claim 16, wherein the content includes text content and non-text content.

18. The server according to claim 17, wherein the text content includes menu content and is read by the text-to-speech engine to generate the audio files, and wherein the non-text content is described by the text-to-speech engine to generate the audio files.

19. The server according to claim 16, wherein the content is an extensible Markup Language (XML) file, and wherein the audible website is generated prior to the user selection of the original website and associated audible website.

20. The server according to claim 16, wherein the set of instructions are further executed to:
    upload the audible website to a content delivery network;
    establish a URL path for accessing the audible website; and
    map pages of the original website to pages of the audible website.

* * * * *